United States Patent
Omersa

(10) Patent No.: US 12,068,511 B2
(45) Date of Patent: Aug. 20, 2024

(54) CARBON DIOXIDE CONVERSION USING COMBINED FUEL CELL AND ELECTROLYSIS CELL

(71) Applicant: OMNAGEN LIMITED, Hertfordshire (GB)

(72) Inventor: Kenneth Omersa, Hertfordshire (GB)

(73) Assignee: OMNAGEN LIMITED, Hertfordshire (GB)

( * ) Notice: Subject to any disclaimer, the term of this patent is extended or adjusted under 35 U.S.C. 154(b) by 813 days.

(21) Appl. No.: 17/260,179

(22) PCT Filed: May 21, 2019

(86) PCT No.: PCT/EP2019/063149
§ 371 (c)(1),
(2) Date: Jan. 13, 2021

(87) PCT Pub. No.: WO2020/015894
PCT Pub. Date: Jan. 23, 2020

(65) Prior Publication Data
US 2021/0313608 A1    Oct. 7, 2021

(30) Foreign Application Priority Data

Jul. 17, 2018 (GB) ...................................... 1811681

(51) Int. Cl.
*H01M 8/0656* (2016.01)
*C01B 3/34* (2006.01)
(Continued)

(52) U.S. Cl.
CPC ........... *H01M 8/0656* (2013.01); *C01B 3/342* (2013.01); *C25B 1/02* (2013.01); *C25B 1/23* (2021.01);
(Continued)

(58) Field of Classification Search
None
See application file for complete search history.

(56) References Cited

U.S. PATENT DOCUMENTS

2006/0068248 A1   3/2006   Ruhl
2008/0060935 A1   3/2008   Hartvigsen
(Continued)

FOREIGN PATENT DOCUMENTS

| CA | 2877956 | 3/2014 |
|---|---|---|
| GB | 2446950 | 2/2008 |
| WO | WO-2017-087360 A1 | 5/2017 |

OTHER PUBLICATIONS

Combined Search and Examination Report, EPO Application No. 1811681.4, dated Jan. 9, 2019, 5 pages.
(Continued)

*Primary Examiner* — Louis J Rufo
(74) *Attorney, Agent, or Firm* — Quarles & Brady LLP

(57) ABSTRACT

A solid oxide cell device is provided which uses hydrocarbon fuel gas and oxygen to remove carbon dioxide from a gas stream, converting it to syngas (carbon monoxide and hydrogen), preferably without any input of external energy beyond that derived from the input gases. Existing processes can then be used to convert the syngas to stable liquid or solid organic chemicals, so that all the input carbon is fixed. Partial oxidation of hydrocarbon fuel gas in a solid oxide fuel cell produces syngas and electricity, and the electricity powers a solid oxide electrolyser which reacts carbon dioxide with further hydrocarbon fuel gas to produce more syngas. The fuel cell and electrolyser together can achieve self-sustaining carbon dioxide utilization.

9 Claims, 7 Drawing Sheets

(51) Int. Cl.
*C25B 1/02* (2006.01)
*C25B 1/23* (2021.01)
*C25B 9/70* (2021.01)
*C25B 15/08* (2006.01)
*H01M 8/12* (2016.01)
*H01M 16/00* (2006.01)

(52) U.S. Cl.
CPC ............... *C25B 9/70* (2021.01); *C25B 15/08* (2013.01); *H01M 16/003* (2013.01); *C01B 2203/0238* (2013.01); *C01B 2203/0255* (2013.01); *C01B 2203/1241* (2013.01); *H01M 2008/1293* (2013.01)

(56) References Cited

U.S. PATENT DOCUMENTS

| | | |
|---|---|---|
| 2008/0314741 A1 | 12/2008 | Balestrino et al. |
| 2010/0086822 A1 | 4/2010 | Omersa |
| 2013/0109767 A1 | 5/2013 | Bogild |
| 2014/0217327 A1 | 8/2014 | Mass et al. |
| 2015/0075997 A1* | 3/2015 | Jiang .................. C25B 1/02 |
| | | 205/347 |
| 2015/0255813 A1 | 9/2015 | Noda |
| 2016/0149249 A1* | 5/2016 | Pozvonkov ......... H01M 8/1016 |
| | | 429/490 |

OTHER PUBLICATIONS

International Search Report and Written Opinion, International Application No. PCT/EP2019/063149, dated Aug. 21, 2019,.

* cited by examiner

CARBON DIOXIDE CONVERSION USING COMBINED FUEL CELL AND ELECTROLYSIS CELL

RELATED APPLICATIONS

This application is a 35 U.S.C. § 371 national phase application of PCT/EP2019/063149 (WO-2020-015894-A1), filed on May 21, 2019, entitled "CARBON DIOXIDE CONVERSION USING COMBINED FUEL CELL AND ELECTROLYSIS CELL", which claims the benefit of GB Patent Application No. 1811681.4, filed Jul. 17, 2018, each of which are incorporated herein by reference in their entirety.

The present disclosure relates to a carbon dioxide conversion device.

Electricity generation and some extractive, industrial and chemical processes are responsible for adding large quantities of carbon dioxide to the atmosphere. There is an urgent need to reduce atmospheric carbon dioxide levels.

Examples of processes which generate large quantities of carbon dioxide are: electricity generation by burning fossil fuels; steam methane reforming (SMR) to produce syngas, and also used for large scale hydrogen production; ethylene production by steam cracking; cement manufacture; and metallurgical works.

In particular, natural gas often has carbon dioxide entrained within the hydrocarbon stream. The level can be as high as 30%, but it should be reduced to below 2.5% to avoid corrosion in distribution pipelines. Conventionally, the carbon dioxide is separated and released to the atmosphere. If membrane separation is used, then some hydrocarbon (typically methane) will be present in the separated carbon dioxide. This methane needs to be flared off, producing more carbon dioxide.

Biogas can be produced from a range of organic matter. The composition is largely a mixture of methane and carbon dioxide, with the ratio determined by the source material. It is normally burnt locally to produce heat and power. However, again the carbon dioxide is conventionally simply released into the atmosphere.

Recent advances in reacting carbon dioxide directly with methane to produce syngas still require a constant energy input, for example CA2877956 which needs high temperature and high pressure, and US2014217327, which requires high temperature. There is a requirement for a self-sustaining method.

Most carbon dioxide emissions have steam and nitrogen mixed with them, rather than hydrocarbons. Conventional Carbon Capture and Storage (CCS) involves separating carbon dioxide from a gas stream, liquifying it, and then burying it underground. However, this is expensive, particularly if the source is geographically a long way from the storage site.

If a plentiful supply of hydrocarbon fuel, such as natural gas, is available, the present invention can provide a much better solution. Self-sustaining reactions between carbon dioxide, the fuel and oxygen produce syngas, which can then be used to make a huge array of liquid chemicals and solid polymers. This captures the carbon in both the carbon dioxide and the fuel as a useful product.

Example applications are natural gas power stations, and cement production. Coal fired power stations are also a possible application, if resources such as shale gas are available.

Solid Oxide Cells (SOCs) provide a convenient platform for processing mixed hydrocarbon and carbon dioxide flows in such a way that carbon dioxide is removed while producing a useful gaseous product.

SOCs generally operate at elevated temperatures, typically above 500° C. They consist of an electrolyte, which conducts oxygen ions but is an electrical insulator, an anode on one side of the electrolyte, and a cathode on the other side.

In a Solid Oxide Fuel Cell (SOFC), fuel is oxidised at the anode, and the oxidant is reduced at the cathode. A potential is built up across the electrolyte, and this can be used to drive an external electrical circuit. Under the correct conditions, a hydrocarbon fuel such as methane can be partially oxidised to carbon monoxide and hydrogen, also known as syngas.

However, SOCs can also be used as electrolysers. An electrical potential is applied across the electrodes, and this can drive a reaction which is not thermodynamically favoured. In this mode it is referred to as a Solid Oxide Electrolyser Cell (SOEC).

SOFCs generate electricity and SOECs consume electricity. The present invention is at least partially based on a recognition that combining the two can provide a self-sustaining device which converts carbon dioxide, hydrocarbon fuel and oxygen into syngas.

Accordingly, the present invention provides in a first aspect a carbon dioxide conversion device including:
  one or more solid oxide fuel cells and one or more solid oxide electrolyser cells, each cell having an electrolyte layer joining a cathode and an anode, the one or more fuel cell cathodes being electrically connected to the one or more electrolyser cell anodes, and the one or more fuel cell anodes being electrically connected to the one or more electrolyser cell cathodes;
  the one or more fuel cell cathodes being located in a first gas zone of the device, and the one or more fuel cell anodes, the one or more electrolyser cathodes and the one or more electrolyser anodes being located in a second gas zone of the device;
  a first gas supply route for supplying a flow of oxygen to the first gas zone;
  a second gas supply route for supplying a flow of a hydrocarbon fuel and carbon dioxide to the second gas zone; and
  a gas removal route for removing a flow of a syngas of carbon monoxide and hydrogen away from the second gas zone;
  wherein the one or more solid oxide fuel cells oxidise the hydrocarbon fuel to the syngas, and the one or more solid oxide electrolyser cells convert the carbon dioxide and hydrocarbon fuel to the syngas.

Thus the partial oxidation of hydrocarbon fuel (e.g. methane) in the SOFC(s) produces syngas plus electricity. The electrolysis of hydrocarbon fuel with carbon dioxide in the SOEC(s) also produces syngas, but requires electricity. However, overall the voltage of the SOFC(s) is enough to power the SOEC(s). Syngas is a major organic chemical feedstock, which can be converted into a wide range of chemicals using Fischer-Tropsch and other reactions. Thus the result is that carbon dioxide can be captured and stored as a useful product e.g. chemicals or plastics. Moreover the production of the syngas does not require any external power source other than the hydrocarbon fuel itself.

If a plentiful supply of hydrocarbon fuel, such as natural gas, is available, the present invention can provide a much better solution for capturing carbon dioxide than CCS. Self-sustaining reactions between carbon dioxide, the fuel and oxygen produce syngas, which can then be used to make a huge array of liquid chemicals and solid polymers.

Example applications for the method are in natural gas power stations, and cement production. Coal fired power stations are also a possible application, if resources such as shale gas are available.

In a second aspect, the present invention provides use of the carbon dioxide conversion device according to the first aspect for producing a flow of a syngas of carbon monoxide and hydrogen from a flow of oxygen and a flow of a hydrocarbon fuel and carbon dioxide.

Optional features of the present disclosure will now be set out. These are applicable singly or in any combination with any aspect of the present disclosure.

Typically, the gas removal route is a first gas removal route, and the device further includes a second gas removal route for removing a flow of oxygen depleted gas away from the first gas zone.

The carbon dioxide conversion device may further include one or more leakage paths (i.e. gas feeds) which fluidly connect the first gas zone to the second gas zone such that a leakage flow of oxygen (i.e. a flow which is subsidiary to the main flows of the first gas supply route, the second gas supply route and the gas removal route) leaks from the first gas zone into the second gas zone to support limited combustion (i.e. a controlled amount of combustion which is subsidiary to the main oxidation and conversion events taking place in the solid oxide fuel cells and the solid oxide electrolyser cells) of the hydrocarbon fuel in the second gas zone, the limited combustion raising the temperatures of the one or more solid oxide fuel cells and the one or more solid oxide electrolyser cells. The leaked oxygen can also help to prevent or reduce coking at the fuel cell and electrolyser cell anodes (particularly at the fuel cell anodes and the electrolyser cell anodes and cathodes).

Conveniently, the electrolyte of each cell is sandwiched between its cathode and its anode. However, another option is for the cathode and the anode of each cell to be located spaced apart on a same surface of their electrolyte.

The second gas supply route may comprise a dedicated flow path for the flow of the hydrocarbon fuel to the second gas zone and a further dedicated flow path for the flow of the carbon dioxide to the second gas zone, wherein the hydrocarbon fuel and the carbon dioxide only meet in the second gas zone.

The carbon dioxide conversion device may have plural stacked elements, each element containing one or more of the solid oxide fuel cells arranged side-by-side with one or more of the solid oxide electrolyser cells, the one or more fuel cell cathodes of each element being electrically connected to the one or more electrolyser cell anodes of that element, and the one or more fuel cell anodes of each element being electrically connected to the one or more electrolyser cell cathodes of that element. In this way, the capacity of the system can be increased, and its thermal management facilitated. Also the system can be built up from modular elements, enabling systems of different sizes and shapes to be produced. Typically, the stacked elements are electrically insulated from each other.

Embodiments of the present disclosure will now be described by way of example with reference to the accompanying drawings in which.

1. Conversion Device

Figure 1:
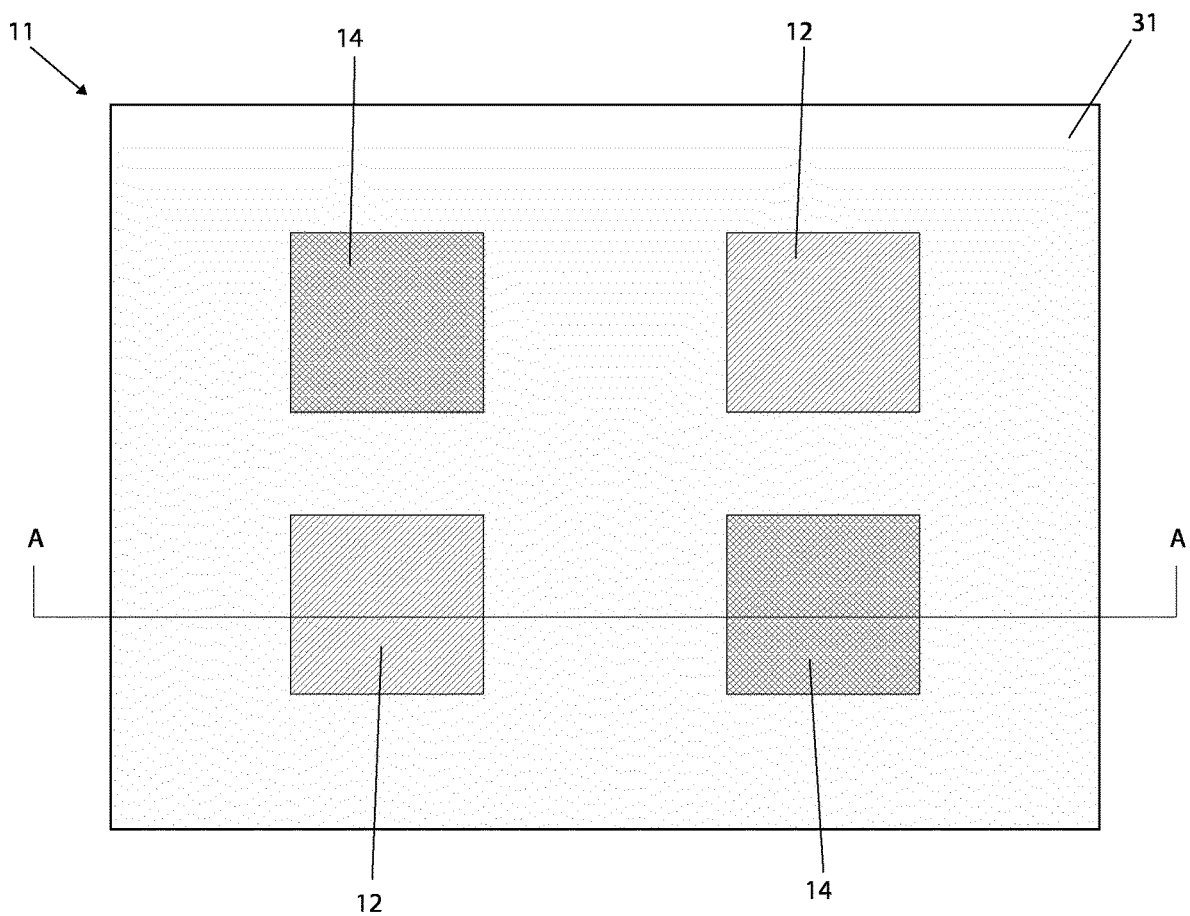
FIG. 1 shows schematically a plan view of an element of a carbon dioxide conversion device.

FIG. 1 shows schematically a plan view of a conversion element 11 of a carbon dioxide conversion device. The element 11 comprises a first conductor 31 on which are located two SOFCs 12 and two SOECs 14. The conductor may be formed, for example, of metal such as AISI 430 ferritic stainless steel, and may be about 100 µm thick. Equal numbers of SOFCs and SOECs are shown, but they may be unequal in number. Also there any be any number of SOFCs and SOECs.

Figure 2:
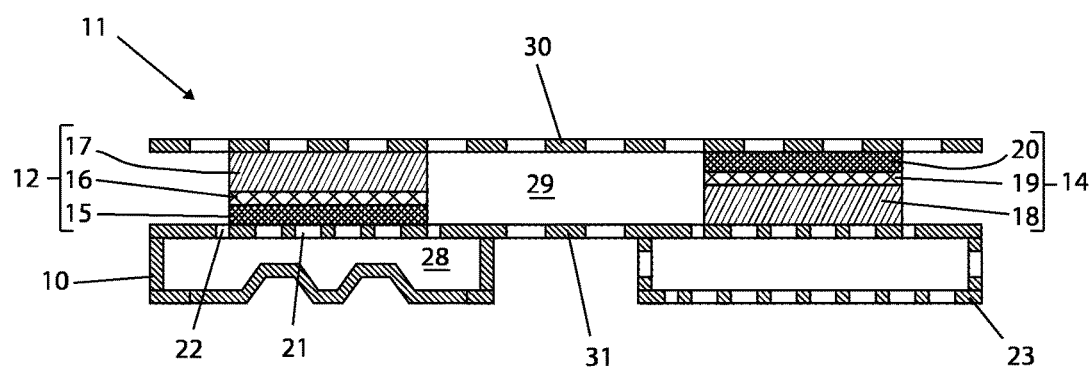
FIG. 2 shows a section A-A of FIG. 1.

FIG. 2 shows a section A-A of FIG. 1. Each SOFC 12 comprises an electrolyte layer 16 sandwiched between a cathode layer 15, and an anode layer 17. Each SOEC 14 comprises an electrolyte layer 19 sandwiched between an anode layer 18, and a cathode layer 20. Each electrolyte may be gas tight or porous, as long as it prevents the two electrodes on either side from short-circuiting.

A portion of the first conductor 31 forms a wall of a conduit 10, which forms a gas flow passage defining a first gas zone 28 for supplying a flow of oxygen (e.g. substantially pure oxygen or air) via pores 21 of porous regions to the cathode 15 of each SOFC. The pores 21 are produced in the conductor 31, e.g. by etching, or laser or mechanical drilling. Another option is to press slots in the metal of the conductor 31 so that the pressed metal forms turbulence-inducing tabs adjacent the slots projecting into the gas flow passage 28, thereby improving gas flow to the cathode 15. The pores may be about 100 µm in diameter and may be similarly spaced from each other in order to both support the SOFCs, and provide enough porosity for the oxygen to reach the cathode 15. The cathode layers 15 may be deposited before or after the pores 21 are made in the conductor 31. If the layers are deposited after the pores are produced, the cathode 15 may be partially or totally contained by the pores.

A second porous conductor 30 connects the SOFC anode layer 17 and the SOEC cathode layer 20. This conductor allows gases to enter and exit these layers from a second gas zone 29 which receives a flow of a hydrocarbon fuel and carbon dioxide, while electrically and thermally connecting the layers and providing a support for the stacking of plural of the elements 11 (discussed in more detail below). The hydrocarbon fuel and carbon dioxide may be supplied to the second gas zone 29 as a mixture, or they may flow into the second gas zone 29 from separate pathways and only mix on arrival therein.

The second conductor 30 may be split into two such that it does not directly connect the SOFCs 12 with the SOECs 14. One half then acts as a current collector for the one or more SOFCs, and can connect multiple SOFCs in parallel. The other half acts as a current collector for the one or more SOECs, and can connect multiple SOECs in parallel. The SOFC(s) and SOEC(s) can then be connected by a separate conductor which passes through a MOSFET, or similar current control device. The current control devices are typically located in a cooler zone, ideally below 100° C., and can be used to control current instabilities if required.

Processing may be facilitated if the layers of SOFCs 12 are applied and sintered to one of the conductors 30, 31, and the layers of the SOECs 14 are applied and sintered to the other, as the SOFCs and the SOECs may need different heat treatments. The conductors 30, 31 may be made from foil, and the pores produced by techniques such as etching or drilling, or they may be formed from expanded metal, wire mesh, metal felt or metallic braiding. However, if a ceramic material or materials is used to form for either of both of the conductors 30, 31, then the layers of the SOFCs 12 and of the SOECs 14 may be sintered on the ceramic, without a need for inert gas or vacuum heat treatment, which is typically required when sintering onto metals. Alternatively, the layers of the SOFCs 12 and of the SOECs 14 may be also produced as sheets, cut to size and then fired. They can then be clamped between conductors 30 and 31. Anode-supported cells are preferable, to allow a thin electrolyte, and lower operating temperatures.

Further, uncovered holes 22 in the first conductor 31 adjacent to each SOFC 12 ensure that the contents of the gas flow passage 28 leak across to the second gas zone 29 in which the SOFCs 12 and the SOECs 14 are located. The amount of this leakage through the holes 22 is dependent on the flow area of the holes 22 (which may be relatively large, e.g. about 1 cm in diameter) and the pressure difference between the first and the second gas zones. The leakage ensures some direct reaction between the fuel and oxidant, in addition to the electrochemical reaction at the cells. This direct reaction maintains the temperature of the cells at the elevated level (typically over 500° C.) which is needed for their proper operation.

The SOFC cathode layer 15 and the SOEC anode layer 18 are electrically connected by the conductor 31 in which the pores 21 and holes 22 are formed. However, those portions of the conductor 31 which do not form a wall of the conduit 10 may also be porous in order that gases can enter and exit the SOEC anode layer 18. In addition, the conductor 31 may provide a support structure 23 beneath each SOEC 14 to provide support when plural elements 11 are stacked. This support structure may also be porous to encourage exchange of gases.

The effect of the gas flows to the first 28 and second 29 gas zones along with the electrical connections of the SOFCs 12 and the SOECs 14 is that the hydrocarbon fuel and carbon dioxide are converted in the second gas zone to a syngas of carbon monoxide and hydrogen, which can be removed by suitable ducting and used in further processes. After the reactions, the gas in the first gas zone will be depleted in oxygen. This gas can either be ducted to further cells, or exhausted to atmosphere via a heat exchanger, to heat incoming gas supplies.

2. Reactions and Thermodynamics

Figure 3:
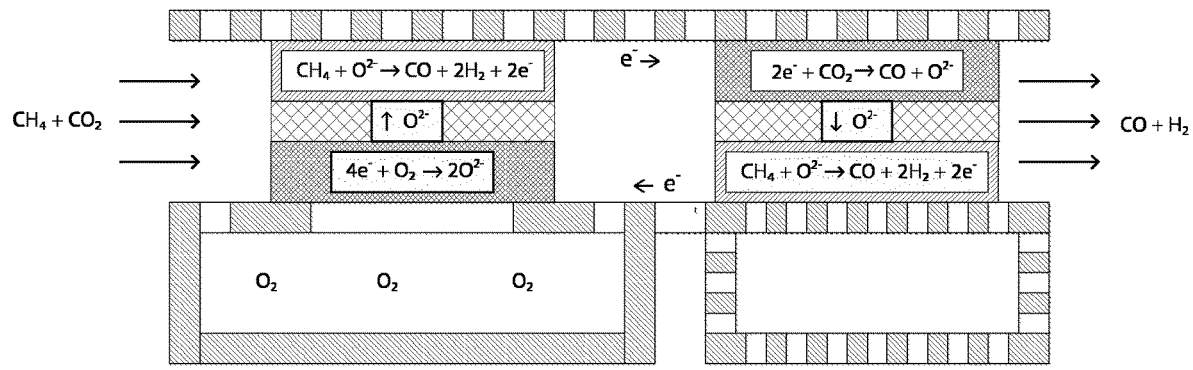
FIG. 3 shows schematically the section of FIG. 2 overlaid with gas flows and electrochemical reactions.

FIG. 3 shows schematically the section of FIG. 2 overlaid with gas flows and electrochemical reactions. The addition of some steam may assist the kinetics of these reactions.

2.1 Fuel Cell

When methane is the hydrocarbon fuel, partial oxidation produces carbon monoxide and hydrogen (i.e. syngas), with the overall fuel cell reaction being:

$$CH_4 + \tfrac{1}{2}O_2 = CO + 2H_2.$$

At 575° C. the Gibbs Free Energy for this reaction is −168.3 kJ/mol. The emf generated by this reaction is directly proportional to the Gibbs Free Energy, although the voltage decreases as current is drawn from the cell, owing to internal resistance within the cell. The voltage also varies with the concentration of reactants.

2.2 Electrolyser Cell

Energy is needed to reduce the carbon dioxide molecule. Electrolysing it with steam is one option, but this is very unfavourable thermodynamically, and requires a high voltage to force the reaction. However, when a hydrocarbon (for example methane) is used as a co-electrolysis partner, more favourable thermodynamics can be achieved. In particular the partial oxidation reaction:

$$CH_4 + CO_2 = 2CO + 2H_2$$

has a Gibbs Free Energy of +27.5 kJ/mol at 575° C. As the magnitude of the Gibbs Free Energy for the electrolysis reaction is much lower than that of the fuel cell reaction, the voltage required to force the electrolysis reaction is also much lower than that of the fuel cell reaction. The voltage required increases as more current is forced into the cell, and it is also affected by the concentration of reactants.

2.3 Combined Reactions

The net effect of the fuel cell and electrolyser reactions is that the voltage of the fuel cell is more than enough to power the electrolyser cell. The sum of the combined reactions is:

$$2CH_4 + CO_2 + \tfrac{1}{2}O_2 = 3CO + 4H_2.$$

These reactions are unlikely to go to 100% completion in any one conversion element 11. However, unreacted reactants can be converted in subsequent elements situated in the gas paths of the reactants.

Other low molecular weight hydrocarbons, such as ethane, propane and butane, can similarly be used to produce syngas. More generally, other aliphatic and aromatic hydrocarbons, including oxygenated hydrocarbons such as alcohols, ketones, ethers and aldehydes, can also be used as long as the thermodynamics of fuel cell and electrolyser pairings are favourable.

Thus, the SOFC cathode 15 is exposed to oxygen, and the reaction is the reduction of oxygen to oxygen ions. The SOFC electrolyte 16 conducts the oxygen ions to the anode 17, which partially oxidises the methane to a mixture of carbon monoxide and hydrogen. Meanwhile, the SOEC cathode 20 reduces carbon dioxide to carbon monoxide and oxygen ions. The SOEC electrolyte 19 then conducts these oxygen ions to the anode 18 (which can have the same composition and reaction as the SOFC anode 17).

The reaction rate can be controlled by the supply of oxygen to the first gas zone 28. Also, oxygen leaking from the first gas zone 28 into the methane and carbon dioxide mix in the second gas zone 29 causes a controlled direct reaction which maintains the temperature, and some of the bled oxygen can enter the anodes 17, 18 and SOEC cathode 20 to reduce or prevent coke formation.

Overall, the partial oxidation of hydrocarbon fuel to syngas in the fuel cells produces electricity; this powers the electrolysis of hydrocarbon and carbon dioxide to produce more syngas. The syngas produced can be used for further chemical processing, such as Fischer-Tropsch processing. This captures the carbon in both the hydrocarbon and carbon dioxide, and allows it to be reused as chemicals. It is a self-powering system, so that no external electrical power or wiring is required.

3. Device Configuration

Each conversion element 11 has at least one fuel cell 12 and at least one electrolyser 14. The fuel cell cathode 15 is supplied with oxidant from the first gas zone 28 by the pores 21. The second gas zone 29 may receive a mixture of hydrocarbon fuel and carbon dioxide, or these two gases may be delivered separately to the second gas zone, and only mixed when they reach the zone.

The size and/or density of the holes 22 which allow oxidant to leak into the second gas zone 29 may vary for different locations in an element 11 and/or for different elements in a stack of elements. In this way a suitable positive pressure and a suitable local leakage rate of the oxidant can be maintained across all elements of a stack.

The first 28 and second 29 gas zones can take various forms. For example, they may be configured as linear or non-linear plane tube conduits. They may incorporate baffles to promote turbulent flow.

In a stack of conversion elements 11, the electrical connections between the SOFCs and SOECs of a given element need to be maintained, while each element of the stack needs to be electrically isolated from the other elements. There are various options for achieving this:

The individual elements may be substantially planar, with the conductors 30, 31 (and typically also the conduit 10) of each element being electrically conducting. The elements can be separated by electrically insulating ceramic spacers which are either loose, or deposited onto a conductor or conduit surface. If the gaps between the elements are also used for delivery of the hydrocarbon fuel and the carbon dioxide to the second gas zone 29, these spacers can be configured to act as baffles to ensure turbulent flow of the carbon dioxide and hydrocarbon fuel mix. The stack can then be clamped together.

The individual elements may be substantially planar, but with outer surfaces of the conductors, conduit assemblies made electrically insulating. In this way, the elements can be stacked directly on top of each other without spacers.

The stack itself can take various shapes, for example concentric circles.

4. Conductor and Conduit Materials

Suitable materials for forming the conversion element 11 are discussed in GB A 2446950.

In general, however, the materials need to provide:

High temperature corrosion resistance to fuel, oxidant and reaction products.

Strength at temperature, and creep resistance.

Compatibility with adjacent electrode materials.

Materials may also need to be able to catalyse reactions.

High temperature alloys, including stainless steels, nickel, cobalt and titanium alloys, can be used to form the conductors 30, 31 and the conduit 10. These are available as sheet, plate and foil in a wide range of alloy compositions. They can be formed and joined by known techniques. Pores and holes formed by e.g. drilling and photochemical etching. Powder metallurgy manufacturing may be used.

The conductors 30, 31 and conduit 10 may carry coatings to improve corrosion resistance, and/or to reduce contact resistance. They may also be treated or coated to affect its catalytic performance.

A number of ceramics are electrically conducting at elevated temperature. These include carbides such as SiC, ZrC and TiC, nitrides such as TiN, TaN and $Si_3N_4$, Indium tin oxide (ITO), and a range of electrically conducting perovskite materials. Such materials can be used to form at least parts of the conductors 30, 31 and conduit 10.

For electrically insulating parts, ceramics such as alumina may be used.

5. Cell Materials

The electrolyte for the SOFCs and SOECs, should conduct oxygen ions in the temperature range of the reaction, but does not conduct electrons. It should also be chemically stable. Cerium gadolinium oxide (10% Gd) (CGO) can be used below 600° C., and yttria (8 mole %) stabilised zirconia (YSZ) above that temperature. Other electrolyte materials such as doped lanthanum gallates, for example $La_{0.8}Sr_{0.2}Ga_{0.8}Mg_{0.2}O_{3-\delta}$, and scandia stabilised zirconia $(Sc_2O_3)_{0.1}(ZrO_2)_{0.9}$, may be used.

Multiple layers of different electrolytes may be used to prevent unwanted reactions between a main electrolyte material and electrode materials. An additional layer may be used to reduce resistance losses at the electrode/electrolyte interface.

The electrodes may be made from a single phase material such as a perovskite, some of which are listed below, or may be a mixture of perovskite and the electrolyte material.

The SOFC cathode reduces the oxidant, e.g. oxygen in air, and conducts oxygen ions and electrons. Example materials for the SOFC cathode are $La_{0.8}Sr_{0.2}MnO_{3-\delta}$ (LSM), $La_{0.6}Sr_{0.4}Co_{0.2}Fe_{0.8}O_{3-\delta}$ (LSCF), $Ba_{0.5}Sr_{0.5}Co_{0.8}Fe_{0.2}O_{3-\delta}$ (BSCF), $GdBaCo_2O_{5+\delta}$ (GBC), $Ba_{0.5}Sr_{0.5}Mn_{0.7}Fe_{0.3}O_{3-\delta}$ (BSMF), and $Sm_{0.5}Sr_{0.5}CoO_{3-\delta}$ (SSC).

The SOEC cathode catalyses a different reaction, and materials such as lanthanum doped strontium titanates for example $La_{0.2}Sr_{0.8}TiO_{3+\delta}$, $La_{0.3}Sr_{0.7}Fe_{0.7}Ti_{0.3}O_{3-\delta}$, and $La_{0.2}Sr_{0.8}Ti_{0.9}Mn_{0.1}O_{3-\delta}$ can be used. Other possible materials include $La_{0.3}Sr_{0.7}Cr_{0.3}Fe_{0.7}O_{3-\delta}$, $La_{0.8}Sr_{0.2}Cr_{0.5}Mn_{0.5}O_{3-\delta}$, and $La_{0.65}Sr_{0.30}Ce_{0.05}Cr_{0.50}Fe_{0.50}O_{3-\delta}$.

The anode materials of both the SOFC and SOEC oxidise the fuel, and conduct oxygen ions and electrons. In particular, for the SOFC anode, a mixture of nickel with the electrolyte may be used. Other possible materials such as $La_{0.9}Sr_{0.1}Cr_{0.5}Fe_{0.5}O_{3-\delta}$ and $La_{0.9}Sr_{0.1}Cr_{0.7}Fe_{0.3}O_{3-\delta}$ are more redox-stable and sulphur-tolerant alternatives.

Suitable manufacturing methods for the functional layers of the SOFCs and SOECs, such as tape casting and screen printing, are described in GB A 2446950. Spray techniques, such as ultrasonic spraying, may also be used. These methods involve a mixture of the ceramic powder, in a solvent with, where necessary, the addition of a surfactant (which acts as a deflocculant), a binder, a plasticiser, and a pore former (which burns out to leave a more gross porosity). 3D printing may also be used.

6. Temperature and Gas Composition Maintenance

Solid oxide cells generally need a minimum temperature in which to operate, which is typically around 500° C. The anode reactions discussed above are exothermic, but the heat may be insufficient to maintain the temperature of the cells. Thus the temperature can be maintained by bleeding a controlled amount of oxidant into the mixture of hydrocarbon fuel and carbon dioxide through the holes (i.e. leakage paths) 22 to achieve a controlled direct oxidation. Additionally or alternatively, resistance heating can be used to maintain the temperature.

The conversion device may further include one or more temperature measuring devices arranged to monitor the device temperature, and to communicate this to a controller for use in controlling the gas flow rates to and from the device.

The conversion device may further include one or more gas composition measuring devices arranged to monitor the composition within the device, and to communicate this to a controller for use in controlling the gas flow rates to and from the device.

Resistance heating can be achieved by choice of materials to introduce electrical resistance at interfaces in the cells and in the conductors. This allows some of the electrical power to be dissipated as heat.

7. Variant Conversion Devices

Figure 4:
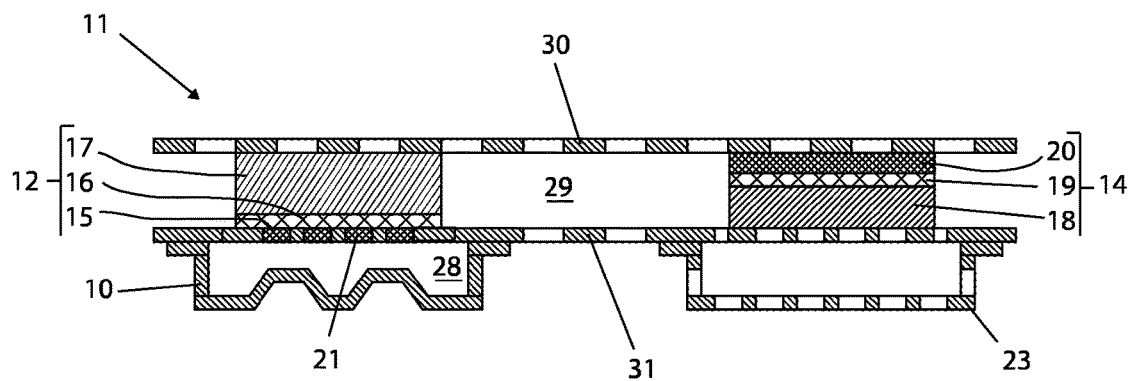
FIGS. 4 to 10 show respective variants of the element of the carbon dioxide conversion device.

The electrolyte 16 of the SOFC may be porous. However, FIG. 4 shows a variant of the element 11 of the carbon dioxide conversion device, in which the electrolyte 16 is fully dense, and seals to the first conductor 31, thereby isolating the SOFC cathode 15, which is entirely within the pores 21, from the second gas zone 29. This arrangement is beneficial for cathode materials which cannot tolerate exposure to fuels. However, as there are no pores 22 in the conductor 31, no oxygen can leak from the conduit 10 to the second gas zone 29. Accordingly, this variant relies on resistance heating to maintain the temperature.

Figure 5:
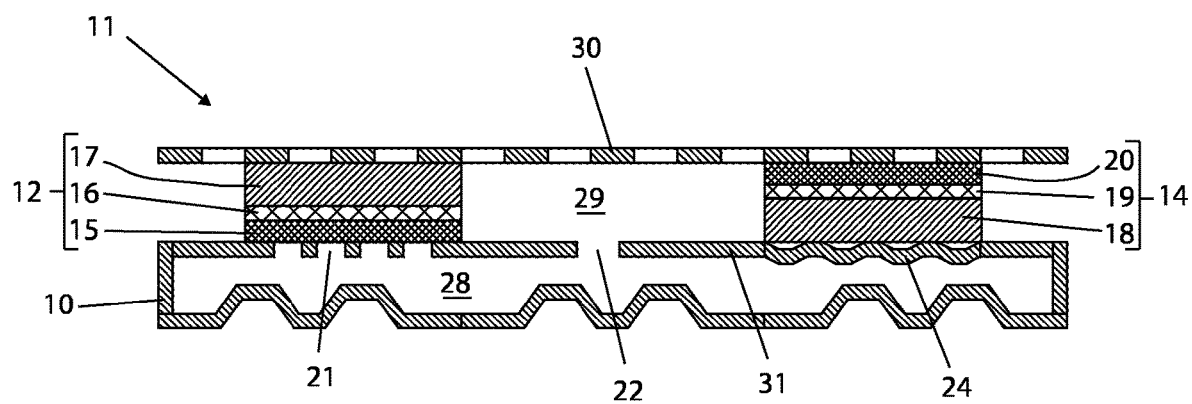

FIG. 5 shows a further variant of the element 11 of the carbon dioxide conversion device, in which the conduit 10 extends below both the SOFC 12 and SOEC 14. In order that gases can also enter and exit the SOEC anode layer 18, the conductor 31 forms a series of peaks or ridges 24 in the region beneath the anode layer 18. The summits of these peaks or ridges make the electrical connection to the anode layer 18 while the valleys between them provide pathways for gas flow to and from the layer.

Figure 6:
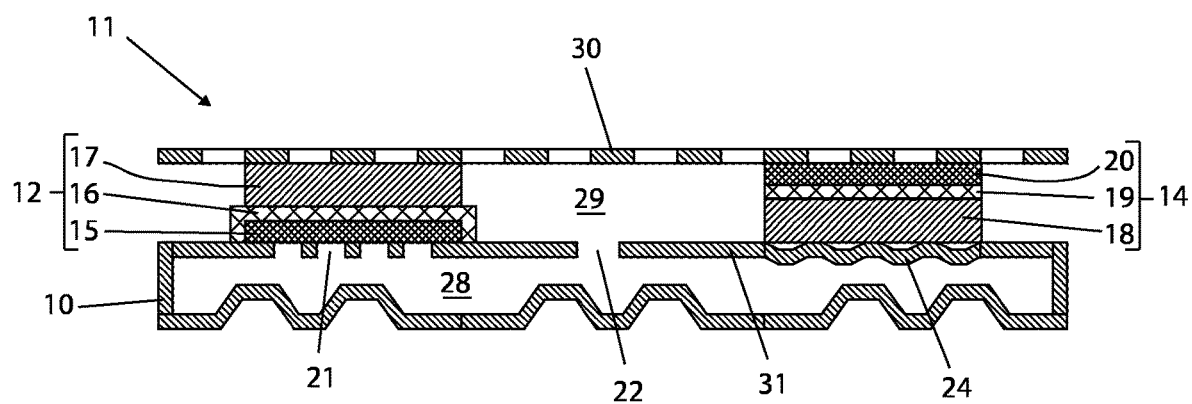

FIG. 6 shows a further variant of the element 11 of the carbon dioxide conversion device, in which the fuel cell electrolyte 16 is fully dense and seals with the conductor 31. However, in this variant, the pores 22 in the first conductor 31 allow oxygen to leak out of the conduit 10 to the second gas zone 29.

Figure 7:
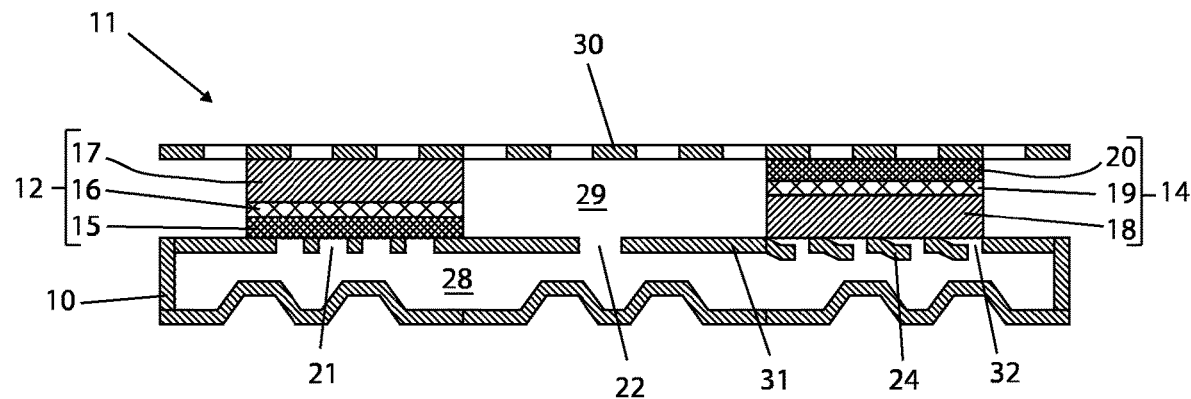

FIG. 7 shows a further variant of the element 11 of the carbon dioxide conversion device, in which the conduit 10 extends below both the SOFC 12 and SOEC 14, and the first conductor 31 below the anode 18 of the SOEC contains further pores 32. These allow a limited amount of oxygen from the first gas zone 28 to more easily reach the anode 18, where it can help prevent coking on the anode. A thick and highly porous anode 18 allows fuel to enter, and syngas to leave.

Figure 8:
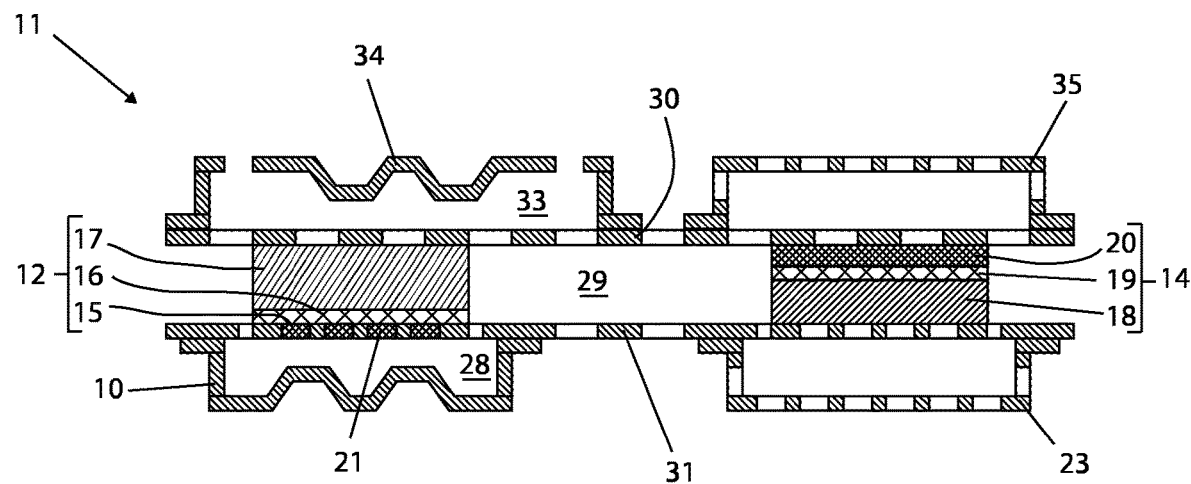

FIG. 8 shows a further variant of the element 11, in which a second gas flow passage 33 forms part of the second gas zone 29, the second gas flow passage 33 facilitating the flow of hydrocarbon fuel to the fuel cell anode 17. Porosity in a second conduit 34 which defines this passage 33, allows fuel to be supplied to the whole of the second gas zone 29 from the second gas flow passage 33. The second conduit 34 and a second porous support structure 35 above the second conductor 30 provide support for the stacking of plural of the elements 11.

Figure 9:
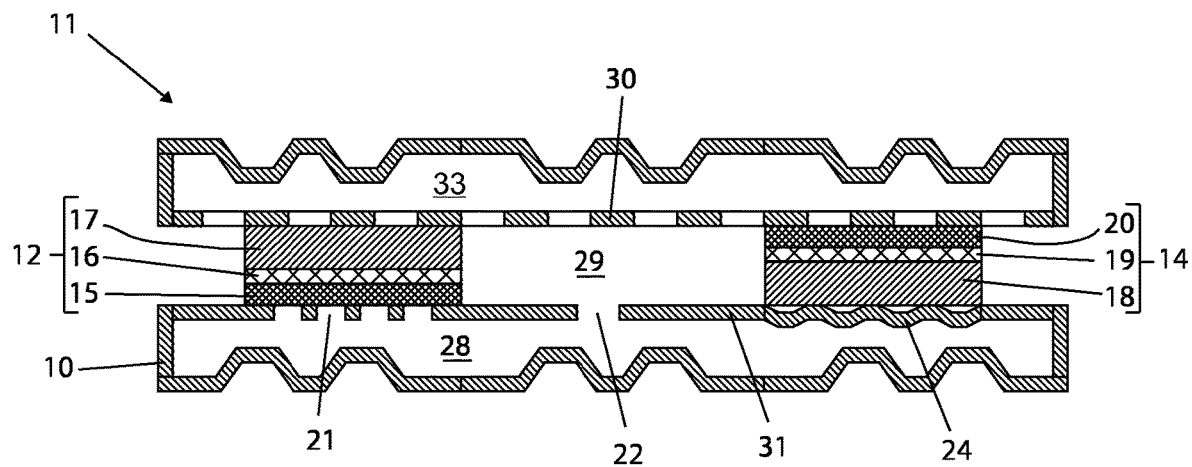
Figure 10:
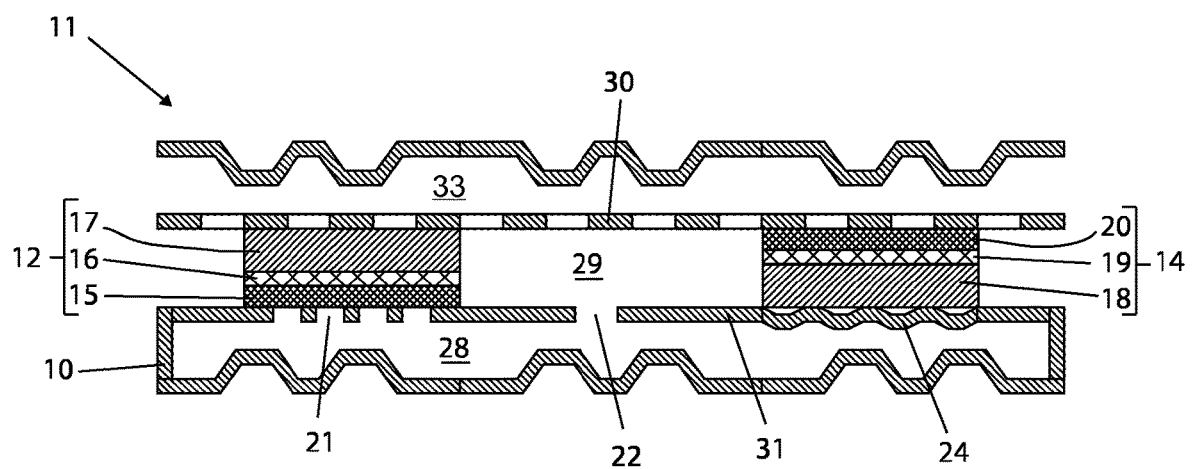

FIG. 9 shows a further variant of the element 11, in which a second gas flow passage 33 forms part of the second gas zone 29 which facilitates the flow of hydrocarbon fuel and carbon dioxide to the fuel cell anode 17 and the electrolyser cell cathode 20, and facilitates the flow of syngas away from the cells. The second gas flow passage 33 also provides support for the stacking of plural of the elements 11. In this variant, the flow of hydrocarbon fuel and carbon dioxide in the second gas flow passage 33 is parallel to the flow of oxidant in the first gas flow passage 28. However, FIG. 10 shows a yet another variant of the element 11, in which the second gas flow passage 33 is arranged to have flow at right angles to that of the first gas flow passage 28.

A thick and highly porous anode layer 18 of the SOEC 14 enhances gas flow within the electrode. This can be combined with a thin electrolyte layer 19 to minimise resistive losses at lower operating temperatures. Metal felt may be located between any of the electrodes and the conductors 30, 31 with which they make electrical contact. The felt provides the electrical connection, while improving gas flow to and from the electrode. The use of metal felt can be particularly beneficial at the anode layer 18 of the SOEC 14, and may allow this layer to be located on a flat region of the wall rather than on peaks or ridges 24.

8. Stacks and Other Arrangements

Figure 11:
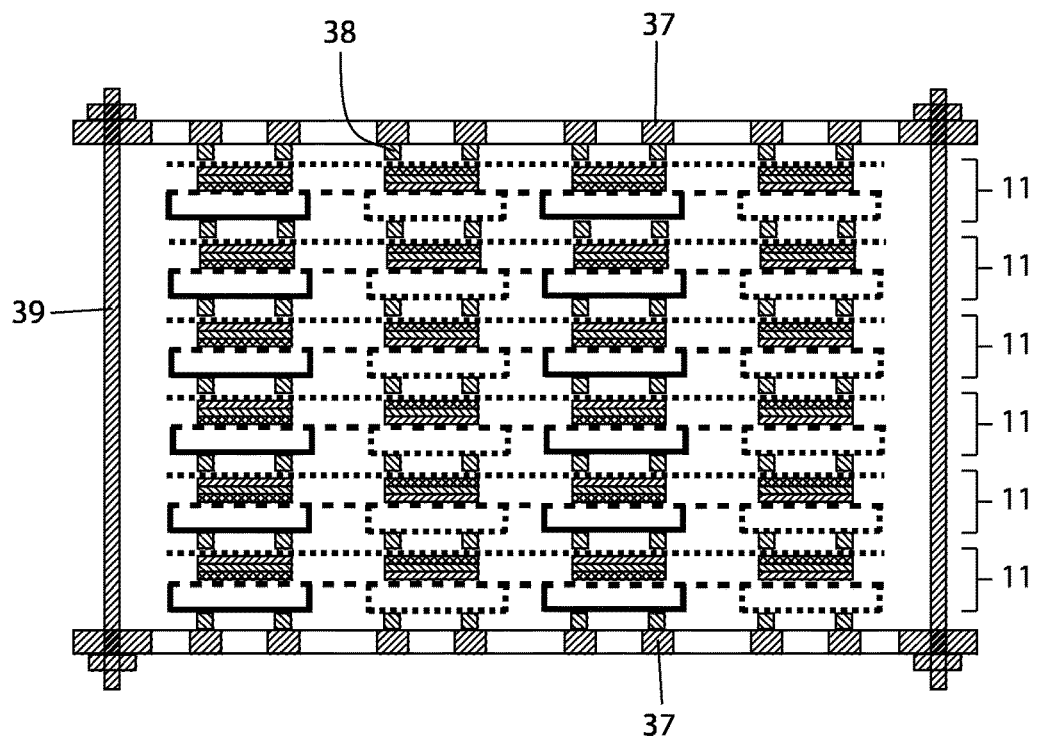
FIG. 11 shows a stack of six elements forming the carbon dioxide conversion device.

FIG. 11 shows a stack of six elements 11 forming the carbon dioxide conversion device. This is placed in a housing which contains a flow of carbon dioxide and hydrocarbon gases. At top and bottom of the stack are porous metal end plates 37, allowing the gases to pass through the stack. Ceramic spacers 38, provide electrical insulation between the elements 11, and also between elements and the plates 37. The spacers also form gaps for flow of the hydrocarbon fuel and carbon dioxide, thereby augmenting the second gas zone 29, and encourage turbulence in these gaps. Tightening bolts at the ends of rods 39 extending between the end plates 37 exert a clamping load on the elements 11 and spacers 38.

Figure 12:
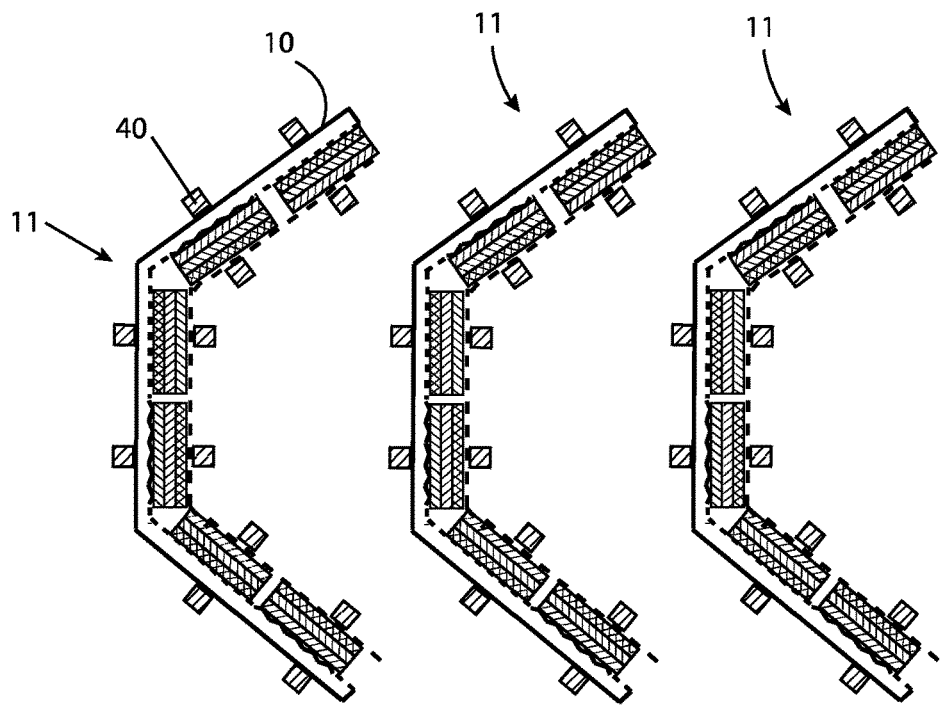
FIG. 12 shows three non-planar elements.

FIG. 12 shows three non-planar elements 11, placed in a housing which contains a flow of carbon dioxide and hydrocarbon gases. Each element is supplied with oxygen by the conduits 10, which are fed and exhausted via manifolds top and bottom (not shown). The supports 40 are located in the manifolds, and serve to clamp the components together to ensure good electrical contact. Baffles between the elements 11 (not shown) provide turbulent flow, allowing gases to access the electrodes.

Figure 13:
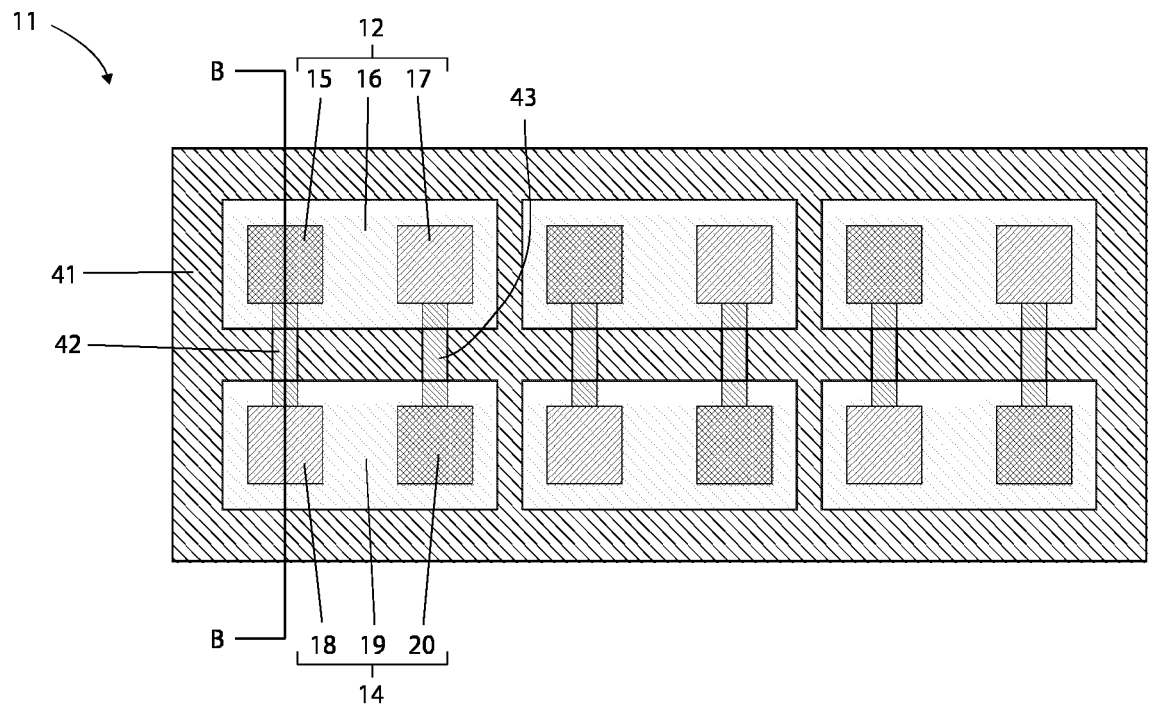
FIG. 13 shows schematically a plan view of an element of a conversion device having planar cells.
Figure 14:
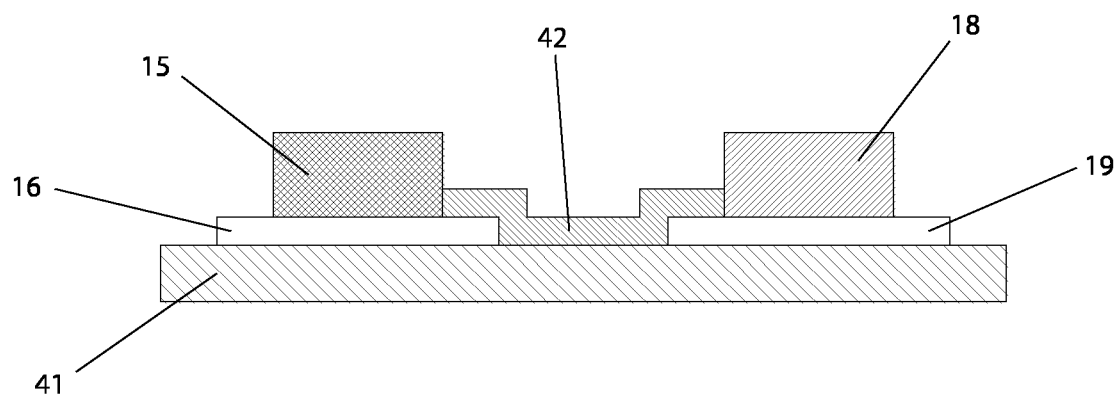
FIG. 14 shows a section on B-B of FIG. 13.

FIGS. 1 to 12 show cells in which the electrodes sandwich the electrolyte. However, it is also possible to form the elements of the carbon dioxide conversion device using planar cells. FIG. 13 shows schematically a plan view of an element 11 of the conversion device having such cells, and FIG. 14 shows a section on B-B of FIG. 13. The element includes a substrate 41 onto which are deposited three SOFCs 12 and three SOECs 14. Each SOFC comprises an electrolyte 16 deposited on the substrate 41, and on the same top surface of the electrolyte 16 are deposited a cathode 15 and an anode 17 in spaced apart relationship. Similarly, on a different area of the substrate 41, each SOEC, comprises an electrolyte 19 deposited on the substrate 41, on the top surface of which are deposited a cathode 18 and an anode 20 in spaced apart relationship.

The electrical circuits are completed by depositing electrically conducting interconnects. Thus interconnects 42 connect each SOFC cathode 15 with an SOEC anode 18, and interconnects 43 connect each SOFC anode 17 with an SOEC cathode 20. The substrate 41 can be an electrical insulator, e.g. a ceramic such as alumina, so that the interconnects 42, 43 do not short circuit with each other. If the substrate is metallic, such as ferritic stainless steel, then an insulating coating can be applied to the substrate to prevent electrical contact between the interconnects and the substrate.

Alternatively, the SOFCs 12 and the SOECs 14 may be deposited on different substrates. The electrical connections can be made by conductors such as wires or bars.

This planar cell morphology has an advantage that the parts of the element 11 can be deposited by inkjet or 3D printing, and then sintered.

As before, oxidant is supplied to the SOFC cathode 15 at a first gas zone, while the other electrodes 17, 18, 20 are exposed to the hydrocarbon fuel/carbon dioxide mixture at a second gas zone. Suitable conduits for the supply of these gas flows and the removal of syngas from the second gas zone are therefore provided, with provision for controlled leakage of oxidant into the hydrocarbon fuel/carbon dioxide mixture to enable limited direct combustion.

As one example, the substrate 41 may take the form of a conduit which is at least partially porous, and supplies oxygen. Each portion of the SOFC electrolyte 16 in contact with the SOFC cathode 15 can then be porous, to allow oxygen to access the cathode.

Other configurations of SOFCs and SOECs are possible, such as a large SOFC with multiple smaller electrolysers around it, or vice versa.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Moreover, in determining extent of protection, due account shall be taken of any element which is equivalent to an element specified in the claims. Various changes to the described embodiments may be made without departing from the spirit and scope of the invention.

All references referred to above are hereby incorporated by reference.

The invention claimed is:

1. A carbon dioxide conversion device comprising:
one or more solid oxide fuel cells and one or more solid oxide electrolyser cells, each cell having an electrolyte layer joining a cathode and an anode, the one or more fuel cell cathodes being electrically connected to the one or more electrolyser cell anodes, and the one or more fuel cell anodes being electrically connected to the one or more electrolyser cell cathodes;
the one or more fuel cell cathodes being located in a first gas zone of the device, and the one or more fuel cell anodes, the one or more electrolyser cathodes and the one or more electrolyser anodes being located in a second gas zone of the device;
a first gas supply route for supplying a flow of oxygen to the first gas zone;
a second gas supply route for supplying a flow of a hydrocarbon fuel and carbon dioxide to the second gas zone; and
a gas removal route for removing a flow of a produced syngas of carbon monoxide and hydrogen away from the second gas zone;
wherein the one or more solid oxide fuel cells oxidise the hydrocarbon fuel to produce the syngas in the second gas zone, and the one or more solid oxide electrolyser cells convert the carbon dioxide and hydrocarbon fuel to produce the syngas in the second gas zone; and
wherein the second gas zone is configured such that the hydrocarbon fuel and carbon dioxide supplied thereto is in fluid communication with the produced syngas.

2. The carbon dioxide conversion device according to claim 1, further comprising one or more leakage paths which fluidly connect the first gas zone to the second gas zone such that a leakage flow of oxygen leaks from the first gas zone into the second gas zone to support limited combustion of the hydrocarbon fuel in the second gas zone, the limited combustion raising the temperatures of the one or more solid oxide fuel cells and the one or more solid oxide electrolyser cells.

3. The carbon dioxide conversion device according to claim 1, wherein the electrolyte of each cell is sandwiched between its cathode and its anode.

4. The carbon dioxide conversion device according to claim 1, wherein the cathode and the anode of each cell are located spaced apart on a same surface of their electrolyte.

5. The carbon dioxide conversion device according to claim 1, wherein the second gas supply route comprises a dedicated flow path for the flow of the hydrocarbon fuel to the second gas zone and a further dedicated flow path for the flow of the carbon dioxide to the second gas zone, wherein the hydrocarbon fuel and the carbon dioxide only meet in the second gas zone.

6. The carbon dioxide conversion device according to claim 1 having plural stacked elements, each element containing one or more of the solid oxide fuel cells arranged side-by-side with one or more of the solid oxide electrolyser cells, the one or more fuel cell cathodes of each element being electrically connected to the one or more electrolyser cell anodes of that element, and the one or more fuel cell anodes of each element being electrically connected to the one or more electrolyser cell cathodes of that element.

7. The carbon dioxide conversion device according to claim 6, wherein the stacked elements are electrically insulated from each other.

8. The carbon dioxide conversion device according to claim 1, wherein the gas removal route is a first gas removal route, and the device further includes a second gas removal route for removing a flow of oxygen depleted gas away from the first gas zone.

9. A method of producing a flow of a syngas of carbon monoxide and hydrogen, the method including using a carbon dioxide conversion device according to claim 1 for producing the flow of a syngas of carbon monoxide and hydrogen from a flow of oxygen and a flow of a hydrocarbon fuel and carbon dioxide.

* * * * *